United States Patent
Chambers (10) Patent No.: US 9,300,796 B2
(45) Date of Patent: Mar. 29, 2016

(54) TELECOMMUNICATIONS DEVICE FOR THE DEAF (TDD) INTERFACE FOR INTERACTIVE VOICE RESPONSE (IVR) SYSTEMS

(75) Inventor: Robert Chambers, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1305 days.

(21) Appl. No.: 12/371,694

(22) Filed: Feb. 16, 2009

(65) Prior Publication Data

US 2010/0208873 A1  Aug. 19, 2010

(51) Int. Cl.
*H04M 11/00* (2006.01)
*H04M 3/42* (2006.01)
*H04M 3/493* (2006.01)
*H04M 11/06* (2006.01)

(52) U.S. Cl.
CPC .......... *H04M 3/42391* (2013.01); *H04M 3/493* (2013.01); *H04M 11/066* (2013.01)

(58) Field of Classification Search
CPC . H04M 11/066; H04M 3/42; H04M 3/42391; H04M 3/493; H04M 3/527; H04M 3/533; H04M 1/02; H04M 2201/40; H04M 3/5307; H04M 2201/60; H04M 3/53325; H04M 11/06; H04M 3/2272; H04N 1/32704; H04Q 1/46
USPC ............... 379/52, 93.26, 88.04, 88.11, 88.13, 379/88.14, 88.18, 93.09, 93.11, 100.15, 379/100.16, 386, 352
See application file for complete search history.

(56) References Cited

U.S. PATENT DOCUMENTS

| 5,121,421 | A  | * | 6/1992  | Alheim      | 379/52       |
|-----------|----|---|---------|-------------|--------------|
| 5,157,759 | A  | * | 10/1992 | Bachenko    | 704/266      |
| 5,253,285 | A  | * | 10/1993 | Alheim      | 379/52       |
| 5,450,470 | A  | * | 9/1995  | Alheim      | 379/52       |
| 5,463,665 | A  | * | 10/1995 | Millios et al. | 379/52   |
| 5,982,853 | A  | * | 11/1999 | Liebermann  | H04M 1/2475 379/52 |
| 6,680,999 | B1 |   | 1/2004  | Garcia      |              |
| 6,763,089 | B2 |   | 7/2004  | Feigenbaum  |              |
| 6,965,664 | B1 | * | 11/2005 | McIntosh    | H04M 3/42391 379/52 |

(Continued)

OTHER PUBLICATIONS

"Cisco Accessibility Brochure ", Retrieved at <<https://www.cisco.com/web/about/responsibility/accessibility/text-only/Cisco_Unified_Communications_Bringing_Innovation_to_Accessibility_14NOV2006.html>>, Nov. 18, 2008, pp. 1-5.
"Solutions ", Retrieved at<<http://www.ontira.com/solutions/media.htm>>, Nov. 18, 2008, pp. 1-4.
Francik,et al. "Telephone Interfaces: Universal Design Filters ", Retrieved at<<http://trace.wisc.edu/docs/taacmtg_aug96/pbfilter.htm>>, Nov. 18, 2008, pp. 1-21.

(Continued)

*Primary Examiner* — Akelaw Teshale
(74) *Attorney, Agent, or Firm* — Steven Spellman; Fehmi Chebil; Micky Minhas (57) ABSTRACT

Various embodiments are directed to a telecommunications device for the deaf (TDD) interface implemented by a server computing system. In one embodiment, the server computing system may be configured to receive an incoming telephony call from a TDD protocol-based device placed to a telephone number associated with the server computing system. In response to the incoming telephony call, the server computing system may invoke an automated telephony services application and associate a TTD interface with the incoming telephony call. The server computing device may output information from the automated telephony services application to the TDD protocol-based device via the TDD interface as TDD protocol-based data. Other embodiments are described and claimed.

20 Claims, 5 Drawing Sheets

(56) References Cited

U.S. PATENT DOCUMENTS

| | | | | |
|---|---|---|---|---|
| 7,817,782 B1* | 10/2010 | Banner | H04M 3/42391 | 379/52 |
| 2002/0057765 A1* | 5/2002 | Hyziak | H04M 11/066 | 379/52 |
| 2003/0072420 A1* | 4/2003 | Feigenbaum | | 379/52 |
| 2005/0048992 A1* | 3/2005 | Wu et al. | | 455/466 |
| 2005/0094777 A1* | 5/2005 | McClelland | H04M 3/42391 | 379/52 |

OTHER PUBLICATIONS

"CCS 6.0 Fact Sheet What is CCS? NTS?", Retrieved at<<http://tap.gallaudet.edu/Standards/ivr/NXi/CCS%206.0%20Fact%20Sheet%20Text%20v1.6.htm>>, Nov. 18, 2008, pp. 1-7.

"Text to Speech Applications", Retrieved at<<http://www.easyivr.com/text-speech-software.htm>>, ,Nov. 18, 2008, pp. 1-5.

\* cited by examiner

TELECOMMUNICATIONS DEVICE FOR THE DEAF (TDD) INTERFACE FOR INTERACTIVE VOICE RESPONSE (IVR) SYSTEMS

BACKGROUND

When providing automated telephony services, business enterprises commonly use interactive voice response (IVR) systems to allow customers to request information and/or to contact representatives through menu-driven options. IVR systems typically output audio prompts and may employ automatic speech recognition (ASR) and/or dual-tone multi-frequency (DTMF) tone recognition to interpret voice and/or telephone keypad inputs from users. In some cases, an IVR system may support automated telephony services provided to customers when dialing the main telephone number of a business and may be designed to respond to user inputs by providing information and/or performing actions without involving human representatives of the business.

Conventional IVR systems, however, are not designed for interaction with customers who may be deaf, hearing impaired, or speech impaired. To provide information and services to customers with hearing and/or speech impairments, a business typically dedicates a separate telephone number for receiving calls from a telecommunications device for the deaf (TDD) which also may be referred to as a teletypewriter (TTY) or text telephone (TT). The TDD may communicate over a telephony network in accordance with one or more TDD protocols and may include a keyboard and a display screen for typing and rendering text-based messages. A call placed by a TDD user to the dedicated TDD telephone number of a business may be answered by a compatible TDD communications terminal enabling the TDD user to exchange text-based messages with a human representative of the business.

In general, text-based messaging is unavailable when a TDD telephony call is placed to a standard telephone terminal or voice telephone number unless the TDD user subscribes to a relay service. For example, the TDD user may subscribe to a service such that a human relay operator joins calls of the TDD user to relay text-to-voice and voice-to-text messages between the TDD user and the other party.

Automated telephony services provide benefits such as reducing costs for business enterprises and increasing customer convenience. Accordingly, improved systems and techniques are needed for providing automated telephony services to users who may be deaf, hearing impaired, or speech impaired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are directed to a telecommunications device for the deaf (TDD) interface implemented by a server computing system. In one embodiment, the server computing system may be configured to receive an incoming telephony call from a TDD protocol-based device placed to a telephone number associated with the server computing system, invoke an automated telephony services application in response to the incoming telephony call, associate a TTD interface with the incoming telephony call, and output information from the automated telephony services application to the TDD protocol-based device via the TDD interface as TDD protocol-based data. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to a telecommunications device for the deaf (TDD) interface implemented by a server computing system. Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
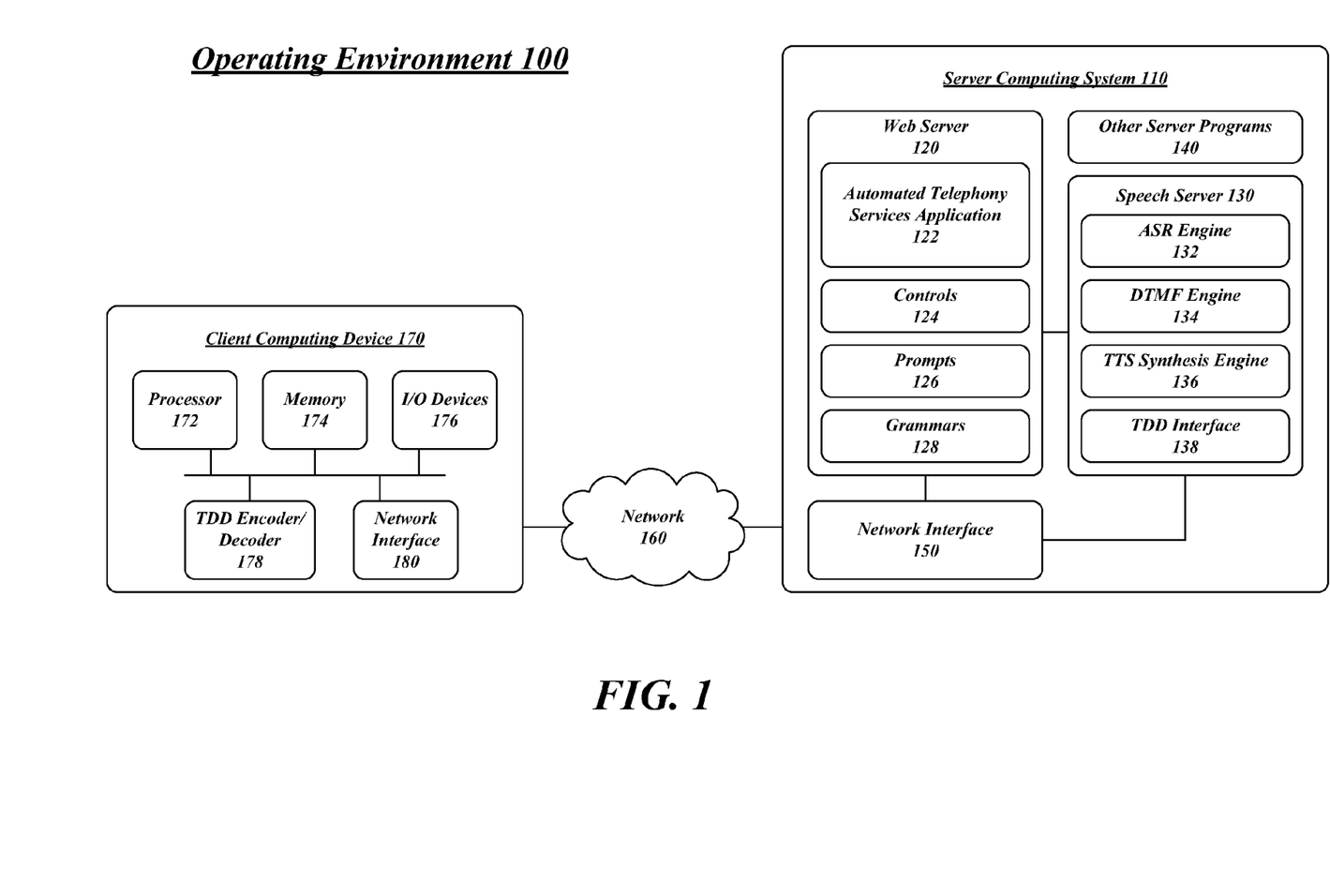
FIG. 1 illustrates an embodiment of an operating environment.

FIG. 1 illustrates a block diagram for an operating environment 100 suitable for practicing the various embodiments. The operating environment 100 may comprise elements designed for implementation by a single entity environment or a multiple entity distributed environment. The elements of the operating environment 100 generally may comprise physical or logical structures for communicating information and, in some cases, may be implemented as hardware, software, or combination thereof, as desired for a given set of design parameters or performance constraints.

Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. Although FIG. 1 includes a limited number of elements for purposes of illustration, it can be appreciated that the operating environment 100 may include more or less elements as well as other types of elements.

Various elements of the operating environment 100 may be implemented utilizing one or more computing devices having computing and/or communications capabilities in accordance with the described embodiments. To implement such capabilities, a computing device may comprise a respective computing system and communications system. The computing system may include various computing elements, such as one or more processors, co-processors, memory units, chipsets, controllers, peripherals, interfaces, oscillators, timing devices, video cards, audio cards, multimedia input/output (I/O) components, and others. The communications system may include various communications elements, such as a transmitter, receiver, transceiver, radio, network interface, baseband processor, antenna, amplifiers, filters, and others.

Exemplary computing devices may include, without limitation, a computer, a personal computer (PC), a desktop computer, a work station, a laptop computer, a notebook computer, a tablet computer, a handheld computer, a minicomputer, a mobile device, a personal digital assistant (PDA), a mobile computing device, a communications device, a telephone, a mobile telephone, a cellular telephone, a smart phone, a handset, a one-way pager, a two-way pager, a messaging device, a network appliance, a web appliance, a server, a server computer, a server array, a server farm, an Internet server, a web server, a network server, a main frame computer, a supercomputer, a distributed computing system, multiprocessor system, processor-based systems, a control system, consumer electronic equipment, a media device, a gaming device, a television, a digital television, a set-top box (STB), wireless access point, base station, subscriber station, mobile subscriber center, radio network controller, a network access device, a telephone network device, a mobile telephone network device, a VoIP network device, a radio network device, a television network device, a satellite network device, a router, a hub, a gateway, a bridge, a switch, a machine, or combination thereof.

The computing devices utilized by the operating environment 100 may be implemented by various hardware and/or software components in accordance with the described embodiments. Exemplary hardware components may include processing devices such as central processing unit (CPU) and/or other processors, microprocessors, application processors, radio processors, baseband processors, digital signal processors (DSP), circuits, circuit elements (e.g., transistors, resistors, capacitors, inductors, and so forth), integrated circuits, application specific integrated circuits (ASIC), programmable logic devices (PLD), a field programmable gate array (FPGA), logic gates, registers, semiconductor device, chips, microchips, chip sets, memory such as volatile and/or non-volatile memory, a display such as a liquid crystal display (LCD) or cathode ray tube (CRT), input devices such a keyboard, mouse, stylus, touch pad, and/or touch screen, networking devices such as ports, network interface cards (NICs), transmitters, receivers, transceivers, and/or antennas, as well as other components.

Exemplary software components may include computer programs, system programs, application programs, operating system (OS) software, middleware, firmware, a software interface, a programmatic interface, an application program interface (API), a network interface, a web interface, a messaging interface, modules, instruction sets, routines, subroutines, functions, calls, computing code, or combination thereof. System programs may include, without limitation, an OS (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, APIs, and others. Application programs may include, without limitation, communications applications (e.g., telephony, voice-mail, VoIP, conferencing, e-mail, IM, SMS, MMS, video messaging), a web browser application, contacts application, calendar application, electronic document application, database applications, media applications (e.g., music, video, television), location-based services (LBS) applications (e.g., GPS, mapping, directions, point-of-interest, locator), and others.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

The operating environment 100 may support wired and/or wireless communications functionality in accordance with the described embodiments. For example, some computing devices may be arranged to communicate information over one or more types of communication links such as a wire, cable, bus, printed circuit board (PCB), backplane, switch fabric, semiconductor material, twisted-pair wire, co-axial cable, fiber optic connection, Ethernet connection, peer-to-peer (P2P) connection, a data channel, a radio channel, a satellite channel, a television channel, a broadcast channel, an infrared (IR) channel, a radio-frequency (RF) channel, a portion of the RF spectrum, one or more licensed or license-free frequency bands, and others.

The operating environment 100 may support communication over one or more types of networks in accordance with the described embodiments. For example, some computing devices and networks may support communications over a circuit-switched network, a packet-switched network, a telephony network (e.g., analog, digital, POTS, PSTN, ISDN, xDSL), a mobile telephony network (e.g., CDMA, GSM, NDAC, TDMA, E-TDMA, NAMPS, WCDMA, CDMA-2000, UMTS, 3G, 4G), a Wide Area Network (WAN), the Internet, a radio network, a television network, a cable network, an optical network (e.g., PON), a satellite network (e.g., VSAT), a public network, a private network, and/or other wired or wireless communications network configured to carry data. Computing devices and networks also may support wireless wide area network (WWAN) communications services including Internet access such as EV-DO, EV-DV, CDMA/1xRTT, GSM/GPRS, EDGE, HSDPA, HSUPA, and others.

Computing devices and networks may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, and others.

Further aspects of various embodiments will become more readily appreciated and better understood by the following description of the elements of the operating environment 100 illustrated in FIG. 1. Although certain exemplary embodiments and implementations may be illustrated and described as comprising a particular combination of elements and performing a particular set of operations, it is to be understood that the principles and techniques discussed herein are not limited to such examples.

In the embodiment shown in FIG. 1, the operating environment 100 includes, among other elements, a server computing system 110 which may comprise or employ one or more server computing devices and/or server programs that operate to perform various methodologies in accordance with the described embodiments. For example, when installed and/or deployed, a server program may support one or more server roles of the server computing device for providing certain services and features. Exemplary server computing devices may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

In some usage scenarios, server programs may be implemented on one physical server computing device. Alternatively or additionally, various server programs may be implemented and scaled across multiple server computing devices and/or communicatively coupled via a local area network (LAN) or suitable intranet or back-end network. In some implementations, server computing devices and/or server programs may be deployed in a tiered environment where one or more server components may be hosted as front-end servers (e.g., communications servers), application servers (e.g., web servers), and/or back-end servers (e.g., database servers).

In various embodiments, server programs may be implemented by one or more computing devices (e.g., server computing devices) as one or more computer-executable program modules comprising executable computer program instructions stored on one or more computer-readable storage media. When executed by the computing device, the stored executable computer program instructions may cause the computing device to perform one or more computer-implemented methods and/or operations in accordance with the described embodiments. Additionally or alternatively, various computer-implemented methods and/or operations may be performed by hardware or digital logic. It can be appreciated that the server components and the operations performed and/or the services provided by such server components as described herein may be combined or separated for a given implementation and may be performed by a greater number or fewer number of server components.

In the example illustrated in FIG. 1, the server computing system 110 may comprise a web server 120. In various implementations, the web server 120 may provide an application environment such as an Internet Information Services (IIS) and/or Application Server Page (ASP) environment for hosting applications. In such implementations, the web server 120 may support the development and deployment of applications using a hosted managed execution environment (e.g., .NET Framework) and various web-based technologies and programming languages such as HTML, XHTML, CSS, Document Object Model (DOM), XML, XSLT, XMLHttpRequestObject, JavaScript, ECMAScript, Jscript, Ajax, Flash®, Silverlight™, Visual Basic® (VB), VB Scripting Edition (VBScript), PHP, ASP, Java®, Shockwave®, Python, Perl®, C#/.net, and/or others. In some embodiments, the applications deployed by the web server 120 may include managed code workflow applications, web-based applications, and/or combination thereof.

As shown, the web server 120 may comprise an automated telephony services application 122. In general, the automated telephony services application 122 may be hosted by the web server 120 and invoked in response to an incoming telephony call to a telephone number associated with the server computing system 110. When executed, the automated telephony services application 122 may be configured to answer the incoming call and automatically interact with the caller by executing a set of programmed workflow processes, tasks, and/or activities.

In various implementations, the automated telephony services application 122 may present initial information (e.g., greeting, default information) to the caller, provide one or more prompts (e.g., menu options, questions) for requesting user input (e.g., menu item selection, employee name, location information, account information) from the caller, retrieve and output information responsive to the user input, and then terminate the call after the caller has confirmed receipt of the desired information. Examples of an automated telephony services application 122 may include, without limitation, an automated business directory application (e.g., employee directory, department directory), an automated information reporting application (e.g., weather, current time, entertainment venue events, sports scores, stock prices, customer account status), and/or other type of conversational program in accordance with the described embodiments.

The web server 120 also may host various application resources for the automated telephony services application 122 such as one or more controls 124, prompts 126, and grammars 128. The controls 124 supporting the automated telephony services application 122 may comprise, for example, basic controls, dialog controls, and/or application controls used to perform various call management functions such as answering, transferring, making, and disconnecting calls.

The prompts 126 may comprise a set of menu options, questions, and/or responses associated with the automated telephony services application 122. In general, the prompts 126 may be used to request user input from the caller and may attempt to constrain responses from the caller to expected user inputs. In some cases, when the user input matches an expected response (e.g., recognized menu item selection, word, or phrase), the prompts 126 may be used to provide preset output information responsive to the user input. In various implementations, the prompts 126 for the automated telephony services application 122 may be stored as text files and/or media files (e.g., sound files) hosted by the web server 120 and/or stored in a database or other suitable file repository.

The grammars 128 may comprise rules to recognize user input provided in response to the prompts 126 and may be used, for example, to match menu item selections (e.g., numbers), words, and/or phrases provided by the caller when interacting with the automated telephony services application 122. The grammars 128 may comprise semantic rules defined by an application developer and associated with the automated telephony services application 122. Alternatively or additionally, the grammars 128 may link to a library of commonly used rules to which the automated telephony services application 122 may refer for recognizing user input. The grammars 128 may be designed to recognize the intent of the caller and may accommodate expected responses to the prompts 126 as well as common phrases that a caller might naturally add to the response. The grammars 128 may comprise XML files, context-free grammar (CFG) files, and/or other suitable files hosted by the web server 120 and/or in another location.

In the example illustrated in FIG. 1, the server computing system 110 may comprise a speech server 130. In various embodiments, the speech server 130 and the web server 120 may operate to implement an IVR system hosted by the server computing system 110. When implementing an IVR system, the speech server 130 and web server 120 may be configured on a single server computing device, separate server computing devices, or scaled out to multiple server computing devices.

It can be appreciated that in addition to the web server 120 and the speech server 130, the server computing system 110 also may host various other server programs 140. Examples of such other server programs 140 may include application developer tools such as Windows® Workflow Foundation for providing a managed code workflow programming model and/or web-based programming module tools. The application developer tools may be used, for example, to create and deploy various types of applications (e.g., automated telephony services, IVR, etc.) on the server computing system 110. It also can be appreciated that the other server programs 140 may comprise or implement various types of communications server programs, messaging server programs, and/or other server roles for the server computing system 110.

When supporting speech-enabled applications (e.g., IVR applications) hosted by the web server 120, for instance, the speech server 130 may comprise various resources such as automatic speech recognition (ASR) engine 132, dual-tone multi-frequency (DTMF) engine 134, and text-to-speech (TTS) synthesis engine 136. For example, when an IVR application accepts an incoming call, a remote procedure call (RPC) channel may be created for establishing a telephony session between the web server 120 and the speech server 130. After the telephony session is initiated, the speech server 130 may allocate the ASR engine 132, DTMF engine 134, and TTS synthesis engine 136 for the call. As the caller interacts with the IVR application, user input received from the caller is passed to the speech server 130.

The ASR engine 132 may perform speech recognition on audio user inputs spoken by the caller and may pass speech recognition results to the IVR application. The DTMF engine 134 may perform DTMF tone recognition on telephone keypad inputs from the user and may pass DTMF tone recognition results to the IVR application. The IVR application may receive the speech and/or recognition results and retrieve information responsive to the recognized user input. To output the requested information to the caller in response to the recognized user inputs, the IVR application may provide the speech server with prerecorded audio data which may be communicated to the caller. Alternatively or additionally, the IVR application may pass text information (e.g., words, phrases) which may be formatted, for example, as Speech Synthesis Markup Language (SSML) output to the speech server 130. In response to the text information, the TTS synthesis engine 136 may synthesize audio output to be communicated to the caller. In various implementations, the audio output provided by the TTS synthesis engine 136 may approximate a human voice reading the text that is responsive to the user input.

In the embodiment of FIG. 1, the server computing system 110 may comprise a telecommunications device for the deaf (TDD) interface 138. As shown, the TDD interface 138 may be implemented by the speech sever 130. The embodiments, however, are not limited to this context. For example, in some embodiments, the TDD interface 138 may be implemented separately and/or independently from the speech server 130.

In general, the TDD interface 138 may be configured to support text-based messaging in accordance with one or more TDD protocols. The TDD protocol may comprise, for example, a Baudot code TDD protocol for encoding text-based messages. Using Baudot code, each character of a text-based message may be encoded as a bit sequence comprising a start bit, a data payload (e.g., five data bits), and a stop bit. A start bit may comprise an 1800 Hz TDD tone, a data payload may comprise five 1400 or 1800 Hz TDD tones, and a stop bit may comprise a 1400 Hz TDD tone. Alternatively or additionally, the TDD protocol may comprise one or more protocols in accordance with International Telecommunication Union (ITU) standards such as V.18, V.21, V.23, and/or other suitable TDD protocol in accordance with the described embodiments.

The TDD interface 138 may be employed by the server computing system 110 to handle TDD telephony calls. For example, an incoming TDD telephony call may be placed by a caller who may be who may be deaf, hearing impaired, or speech impaired using a TDD device to a telephone number associated with a business enterprise. In accordance with various embodiments, the incoming TDD telephony call may be placed to a telephone number associated with the automated telephony services application 122. Accordingly, telephony calls made to such telephone number may be answered and serviced by the automated telephony services application 122.

In some implementations, the telephone number associated with the automated telephony services application 122 may be a dedicated TDD telephone number for a business enterprise. The embodiments, however, are not limited to this context. In various embodiments, for example, the telephone number associated with the automated telephony services application 122 to which the incoming TDD telephony call is placed may be a main or universal telephone number and/or other voice telephone number (e.g., non-TDD telephone number) of the business enterprise. It can be appreciated that in such embodiments, TDD users may dial the same telephone number as voice users.

As shown, the server computing system 110 may comprise a network interface 150. In various implementations, the network interface 150 may be configured to receive incoming telephony calls (e.g., TDD telephony calls) to telephone numbers associated with the server computing system 110 and to route the incoming telephony calls to appropriate servers (e.g. web server 120, speech server 130) within the server computing system 110. The network interface 150 may communicatively couple the server computing system 110 over wireless and/or wired communications media to various types of networks such as network 160. The network 160 may comprise, for example, one or more of an analog or digital telephony network (e.g., POTS, PSTN, ISDN, XDSL), a mobile telephony network (e.g., CDMA, GSM, NDAC, TDMA, E-TDMA, NAMPS, WCDMA, CDMA-2000, UMTS, 3G, 4G), a VoIP telephony network, and/or other suitable circuit-switched or packet-switched network in accordance with the described embodiments.

The network interface 150 may comprise various hardware and/or software components for receiving and routing incoming telephony calls. In some embodiments, for example, the network interface 150 may comprise a telephony board to provide a physical connection to the network 160, drivers for interfacing with an OS of the server computing system 110, and/or telephony interface management software for accepting incoming telephone calls and routing incoming calls to the appropriate servers. The network interface 150 may support different types of telephony communication (e.g., analog, digital, cellular, VoIP, circuit-switched, packet-switched, etc.) and protocols including IP-based protocols such as VoIP, Session Initiation Protocol (SIP), Real Time Protocol (RTP), and others.

In some implementations, the network interface 150 may comprise one or more gateway devices and/or programs for managing communication between different types of devices and networks. Exemplary gateways may include, without limitation, an Internet Protocol Private Branch Exchange (IP PBX) gateway that supports Internet Protocol along with analog and digital circuit-switched connections to the PSTN telephony network, a VoIP gateway that supports the transport of VoIP messages, and/or other types of mediation devices and/or programs in accordance with the described embodiments.

The network interface 150 may be structured, arranged, and/or configured to allow the server computing system 110 to establish a telephony communications session over the network 160 with various types of computing devices such as a client computing device 170. When a telephony communications session is established, the server computing system 110 and the client computing device 170 may communicate information over the network 160 and coordinate operations between each other, which may involve the unidirectional or bidirectional exchange of information. The information communicated over the network 160 may be implemented as data signals and/or messages sent across interfaces such as parallel interfaces, serial interfaces, and/or bus interfaces. In various embodiments, the server computing system 110 and the client computing device 170 may communicate TDD data signals and/or messages comprising TDD protocol-based data (e.g., TDD bit sequences and/or TDD tones).

The client computing device 170 may comprise, for example, a TDD (e.g., teletypewriter, text telephone) and/or other type of computing device capable of communicating text-based messages in accordance with one or more TDD protocols. In some embodiments, for example, the client computing device 170 may be implemented as a computer (e.g., PC, laptop computer) or mobile computing device (e.g., mobile telephone, smart phone) comprising software for communicating TDD protocol-based data (e.g., TDD bit sequences and/or TDD tones).

As shown in the embodiment of FIG. 1, the computing and communications capabilities of the client computing device 170 (e.g., TDD) may be supported by various hardware and/or software components such as a processor 172, memory 174, I/O devices 176, TDD encoder/decoder 178, and network interface 180. The processor 172 may comprise a CPU, communications processor, and/or other suitable processing unit for supporting operations of the client computing device 170 in accordance with the described embodiments. The memory 174 may comprise one or more types of computer-readable storage media capable of storing data such as volatile memory or non-volatile memory, removable or non-removable memory, erasable or non-erasable memory, writeable or re-writeable memory, and so forth.

The I/O devices 176 may comprise, for example, keys for inputting characters of a text-based message and dialing a telephone number and a display screen for displaying outgoing and incoming text-based messages. The TDD encoder/decoder 178 may comprise hardware and/or software components for encoding user inputted text into TDD protocol-based data signals and/or messages and for decoding TDD protocol-based data signals and/or messages into text to be displayed to the user. The network interface 180 of the client computing device 170 may comprise hardware and/or software components supporting communication of TDD data signals and/or messages over the network 160. When employing a Baudot code TDD protocol, for example, the TDD encoder/decoder 178 may encode characters of input text as bit sequences (e.g., start bit, data payload bits, stop bit), and the network interface 180 may communicate Frequency Shift Keying (FSK) modulated TDD data signals over the network 160 at 45 or 50 baud.

In various implementations, the server computing system 110 may receive an incoming TDD telephony call from the client computing device 170 (e.g., TDD) over the network 160. The TDD telephony call may be placed by the client computing device 170 to a telephone number that is associated with server computing system 110 and configured to be handled by the automated telephony services application 122. The TDD telephony call may be received by the server computing system 110 via the network interface 150 and then routed to the web server 120 hosting the automated telephony services application 122.

As mentioned above, the destination telephone number of the TDD telephony call may be a dedicated TDD telephone number or voice a telephone number associated with server computing system 110. In cases where the destination telephone number is a dedicated TDD telephone number, the incoming telephony call is expected be a TDD telephony call. In cases where the destination telephone number is a voice telephone number, the server computing system 110 may be configured to determine whether the incoming telephony call is a TDD telephony call. In some implementations, for example, when an incoming telephony call is received by the server computing system 110 via the network interface 150, a handshaking operation may be performed to detect whether the source of the incoming telephony call is a TDD protocol-based device. The handshaking operation may involve a negotiation mechanism for allowing the server computing system 110 to detect that the client computing device 170 is a TDD and/or the TDD protocol employed by the client computing device 170. Alternatively or additionally, an initial communication from the client computing device 170 may comprise an announcement identifying an incoming TDD telephony call.

The incoming TDD telephony call may be communicated as analog or digital TDD data signals and/or messages (e.g., data packets). Accordingly, in some implementations, the server computing system 110 may analyze the incoming telephony call and detect a TDD telephony call based on various signaling and/or packet characteristics of the TDD data signals and/or messages.

After receiving and/or detecting an incoming TDD telephony call, the network interface 150 may notify the web server 120 of the incoming TDD telephony call. Upon receiving the notification of the incoming TDD telephony call from the network interface 150, the web server 120 may communicate a request such as an HTTP request including a call identifier to invoke the automated telephony services application 122. Once the automated telephony service application 122 is active, the web server 120 may instruct the network interface 150 to route messages received during the TDD telephony call directly to the automated telephony services application 122.

When the automated telephony services application 122 accepts an incoming TDD telephony call, a telephony session may be established between the web server 120 and the speech server 130 and the TDD interface 138 may be associated with the TDD telephony call. In various embodiments, the automated telephony services application 122 may answer the TDD telephony call and automatically interact with the TDD user by passing information to and receiving information from the TDD interface 138. For example, initial information (e.g., greeting, default information), prompts 126 (e.g., menu options, questions), and/or responsive output information which is to be communicated to the TDD user may be passed to the TDD interface 138 for encoding and communication to the TDD user as TDD data signals and/or messages comprising TDD protocol-based data (e.g., TDD bit sequences and/or TDD tones).

As the TDD user responds to the prompts 126 and/or otherwise interacts with the automated telephony services application 122, user input comprising TDD protocol-based data (e.g., TDD bit sequences and/or TDD tones) is received by the TDD interface 138 and decoded into text. The TDD interface 138 may then perform TDD recognition by robustly matching the text against the grammars 128 associated with the automated telephony services application 122 and may pass a TDD recognition result to the automated telephony services application 122.

When TDD protocol-based data (e.g., TDD bit sequences and/or TDD tones) is received and decoded by the TDD interface 138, the decoded text generally may comprise the identical text-based message that was typed by the TDD user. The TDD interface 138 may then match elements (e.g., keywords, conversational phrases) of the text-based message against the grammars 128 to derive the intent of the TDD user and formulate a TDD recognition result. The TDD recognition result may be passed from the TDD interface 138 to the automated telephony services application 122 which, in turn, may provide output responsive to the TDD recognition result.

In various usage scenarios, a text-based message from a TDD user may include one or more common TDD terms representing abbreviated forms of certain words, phrases, and commands. Exemplary TDD terms may include, without limitation GA (Go Ahead) for indicating the end of a statement or question during a conversation and requesting a reply, SK (Stop Keying) for indicating the end of a conversation, BRB (Be Right Back) for requesting a break in the conversation, PLS (Please), THX (Thank You), NBR (Number), TMW (Tomorrow), and others. TDD terms such as CA (Communications Assistant), RO (Relay Operator), and/or OPR (Operator) may be used to request communication with a human representative. In addition, the text-base message sometimes may use Xs to indicate typing errors instead of backspaces and may use Q, QQ, or QM at the end of a question instead of a question mark.

In some implementations, the abbreviated forms of the TDD terms may not conform to rules and/or expected user input defined by the grammars 128. Accordingly, the TDD interface 138 may be configured to understand and translate common TDD terms into words, phrases, and/or commands which conform to the rules of the grammars 128 and to formulate a TDD recognition result which is capable of being understood and responded to by the automated telephony services application 122.

As described above, the speech server 130 and the web server 120 may operate to implement an IVR system hosted by the server computing system 110. In such embodiments, the web server 120 may host one or more IVR applications which may comprise speech-enabled managed code workflow applications and/or web-based applications implemented, for example, using embedded script for controlling dialog flow, HTML, Speech Application Language Tags (SALT) and/or VoiceXML technology. The IVR applications also may be associated with corresponding controls, prompts, and grammars as defined by application developers, for example. While not limited in this regard, the automated telephony application 122 may comprise an IVR application hosted by the web server 120 in one or more embodiments.

When implementing an IVR system, the server computing system 110 may employ the TDD interface 138 for automatically extending the capabilities of the IVR system to handle TDD telephony calls. For example, an incoming TDD telephony call may be placed to a telephone number associated with a business enterprise configured to be answered and serviced by an IVR application. The incoming TDD telephony call may be received by the server computing system 110, and a handshaking operation may be performed to detect that the source of the incoming telephony call is a TDD protocol-based device.

Upon detection and acceptance of the TDD telephony call, the IVR application may be invoked, and the TDD interface 138 may be associated with the TDD telephony call. It can be appreciated that the TDD interface 138 may be allocated to the incoming TDD call separately from and/or along with the ASR engine 132, DTMF engine 134, and TTS synthesis engine 136 when the TDD telephony call is accepted by the IVR application.

The IVR system may automatically use and/or switch to a text emulation mode in which the IVR application may answer the TDD telephony call and automatically interact with the TDD user by passing information to and receiving information from the TDD interface 138. For example, initial information (e.g., greeting, default information), prompts (e.g., menu options, questions), and/or responsive output information which would be communicated to a caller as audio output for a voice call is instead communicated to the TDD user as text. As the TDD user responds to prompts and/or otherwise interacts with the IVR application, user input which would normally would be passed to and recognized by the ASR engine 132 and/or DTMF engine 134 for a voice call is instead passed to the TDD interface 138.

The user input may comprise TDD protocol-based data (e.g., TDD bit sequences and/or TDD tones) which is received by the TDD interface 138 and decoded into text. The TDD interface 138 may match the text against the grammars associated with the IVR application and may pass a recognition result to the IVR application. In response to the recognition result, the IVR application may retrieve and output responsive information as text via the TDD interface 138 instead of using the TTS synthesis engine 136. The text may be encoding and communication to the TDD user as TDD data signals and/or messages comprising TDD protocol-based data (e.g., TDD bit sequences and/or TDD tones).

By implementing the TDD interface 138, support for TDD telephony calls may be automatically available to an IVR system and/or IVR applications configured to handle voice telephony calls without extra authoring and/or modification of such applications. For example, when operating in the text emulation mode, the IVR system may rely on the controls, prompts, and grammars associated with the IVR application. In the text emulation mode, the IVR system may be configured to redirect information which would be handled by the ASR engine 132, DTMF engine 134, and/or TTS synthesis engine 136 during a voice telephony call to and from the TDD interface 138. In some cases, the ASR engine 132 may still be available to the IVR application in the text emulation mode. For example, if a prompt is available only as a prerecorded audio file, the ASR engine 132 may convert the audio to text which then may be communicated to the TDD user via the TDD interface 138. Accordingly, application developers may build IVR applications that only support speech recognition, speech synthesis, and/or DTMF but that may be enabled to automatically handle and interpret TDD telephony calls when deployed to support access by users who may be deaf, hearing impaired, or speech impaired.

Figure 2:
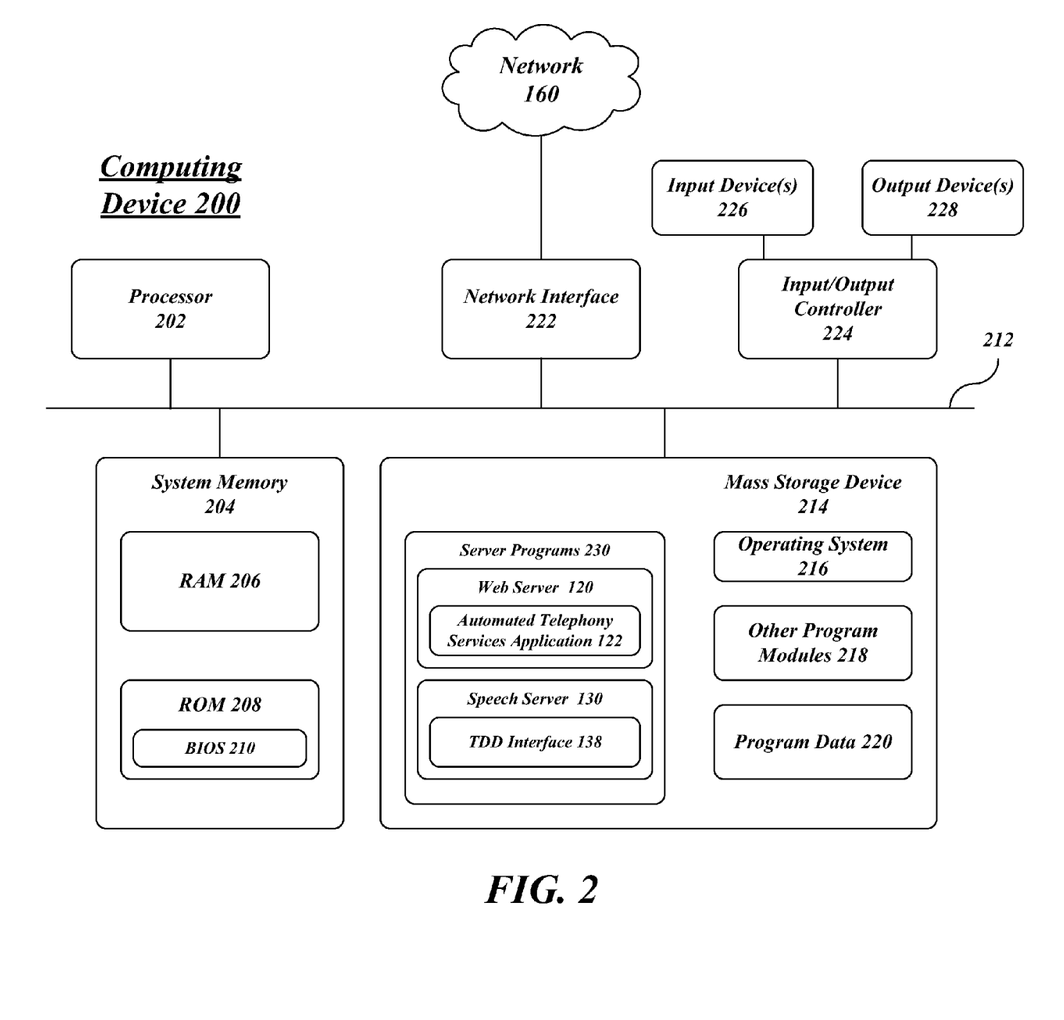
FIG. 2 illustrates an embodiment of a computing device.

FIG. 2 provides an illustrative architecture for a computing device 200 suitable for practicing the various embodiments. The computing device 200 may be representative of, for example, a server computing device implemented by the server computing system 110. As shown, the computing device 200 illustrates a conventional computing architecture for a personal or server computer, including a processing system comprising a processor 202 and a system memory 204. The system memory 204 may include, among other types of memory, a random access memory (RAM) 206 and a read-only memory (ROM) 208. An input/output (I/O) system, such as a basic I/O system (BIOS) 210, may implement routines to assist in transferring information between elements within the computing device 200, such as during startup operations, using logic stored in the ROM 208. A system bus 212 communicatively couples all of the elements of the computing device 200 to facilitate information transfer and data processing operations.

The computing device 200 further includes a mass storage device 214 for storing an operating system 216 such as a MICROSOFT WINDOWS® operating system from Microsoft Corporation, Redmond, Wash. or other suitable operating system. The mass storage device 214 also may store various application programs, as described below, as well as other program modules 218 and program data 220.

The mass storage device 214 is connected to the processor 202 through a mass storage controller (not shown) connected to the system bus 212. The mass storage device 214, and its associated computer-readable media, provides non-volatile storage for the computing device 200. Although the description of computer-readable media contained herein refers to a mass storage device, such as a hard disk or CD-ROM drive, it can be appreciated by those skilled in the art that computer-readable media can be any available media that can be accessed by the computing device 200. By way of example, and not limitation, computer-readable media may comprise computer-readable storage media and communication media.

Computer-readable storage media includes volatile and non-volatile, removable and non-removable media implemented in any method or technology for storage of information such as computer-readable program instructions, data structures, program modules, or other data. Computer-readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other storage medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

According to various embodiments, the computing device 200 may operate in a networked environment using logical connections to remote computers through a network, such as network 160. The computing device 200 may connect to the network 160 through a network interface 222 (e.g., a wired or wireless network interface) connected to the system bus 212. It can be appreciated that the network 160 may comprise any type of network in accordance with the described embodiments including, without limitation, a telephony network, a cellular telephony network, a Transmission Control Protocol (TCP) and Internet Protocol (IP) network such as the Internet, a wide area network (WAN), a local area network (LAN), and/or others and that the network interface 222 may support various transport layers such as GPRS, CDMA 1×RTT, IEEE 802.11, Bluetooth® (PAN), and others for connecting to a variety of networks and/or remote computer systems.

The computing device 200 may include an I/O controller 224 for receiving and processing input from a number of input devices 226. A user may enter commands and information into the computing device 200 through various input devices 226 such as a keyboard and pointing device, such as a mouse, trackball or touch pad. Other examples of input devices 226 may include a microphone, joystick, game pad, satellite dish, scanner, or the like. The input devices 226 may be connected to the processor 202 through the I/O controller 224 that is coupled to the system bus 212, but may be connected by other interfaces and bus structures, such as a parallel port, game port or a universal serial bus (USB). The I/O controller 224 also may provide output to various output devices 228, such as a monitor or other type of display device that is connected via the I/O controller 224 to the system bus 212, a printer, speakers, and other peripheral devices.

As mentioned above, a number of program modules and data files may be stored in the mass storage device 214 and RAM 206 of the computing device 200. In the example illustrated in FIG. 2, the mass storage device 214 and RAM 206 may store the operating system 216 as well as one or more server programs 230. The server programs 230 may include the web server 120 comprising the automated telephony services application 122, the speech server 130 hosting the TDD Interface 138, and other programs which may be operative in accordance with the described embodiments.

Figure 3:
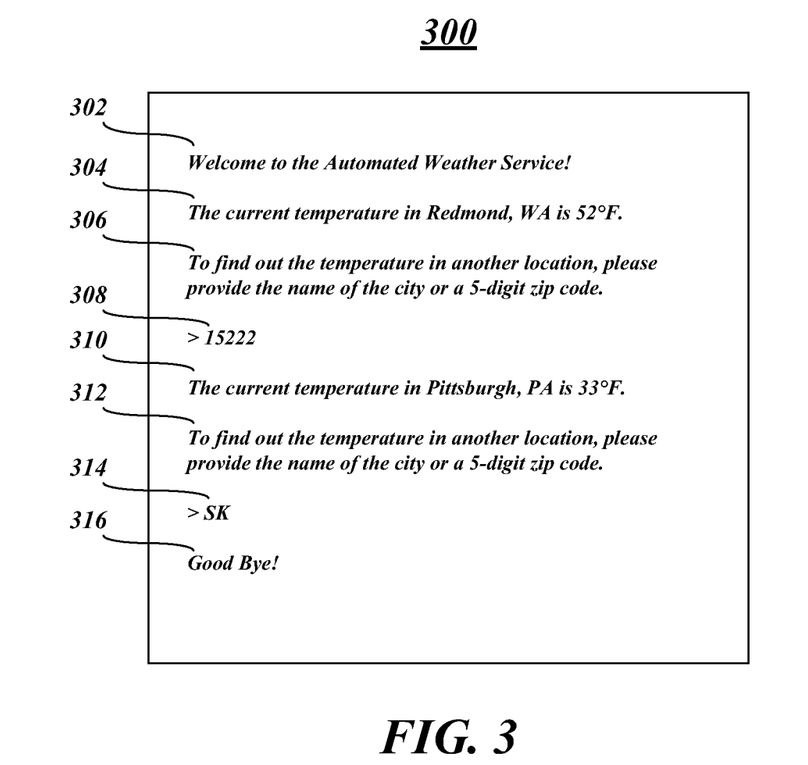
FIG. 3 illustrates an embodiment of a user interface.

FIG. 3 illustrates a user interface (UI) 300 suitable for practicing the various embodiments. With reference to FIG. 1, in some implementations, the UI 300 may be an interface of the client computing device 170 (e.g., TDD) presented on a display screen. In this embodiment, the UI 300 may be presented as a TDD user interacts with an automated telephony services application 122 implemented as an automated weather reporting application.

The automated telephony services application 122 may present the UI 300 after being invoked in response to receiving an incoming TDD telephony call from the client computing device 170 (e.g., TDD). A TTD interface 138 may be associated with the TDD telephony call for processing TDD protocol-based data. It can be appreciated that the UI 300 illustrates an exemplary conversational exchange of text-based messages and that embodiments are not limited to this context.

As shown, the UI 300 may output a greeting 302, default information 304, and a first prompt 306 to the TDD user. In response to the prompt 306, the TDD user may provide user input 308. The UI 300 may output a response 310 to the user input 308 along with a second prompt 312. In response to the second prompt 312, the TDD user may input a TDD term 314 for ending the call. The UI 300 may output a termination message 316 in response to the recognized TDD term 314 indicating the end of the call.

In various implementations, the automated telephony services application 122 that presents the UI 300 may comprise an IVR application configured to handle voice telephony calls. When handling voice telephony calls, the greeting 302, default information 304, first prompt 306, response 310, second prompt 312, and termination message 316 may be outputted to a caller as audio. By implementing the TDD interface 138, the automated telephony services application 122 may be automatically enabled to handle and interpret TDD telephony calls when deployed to support access by users who may be deaf, hearing impaired, or speech impaired.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
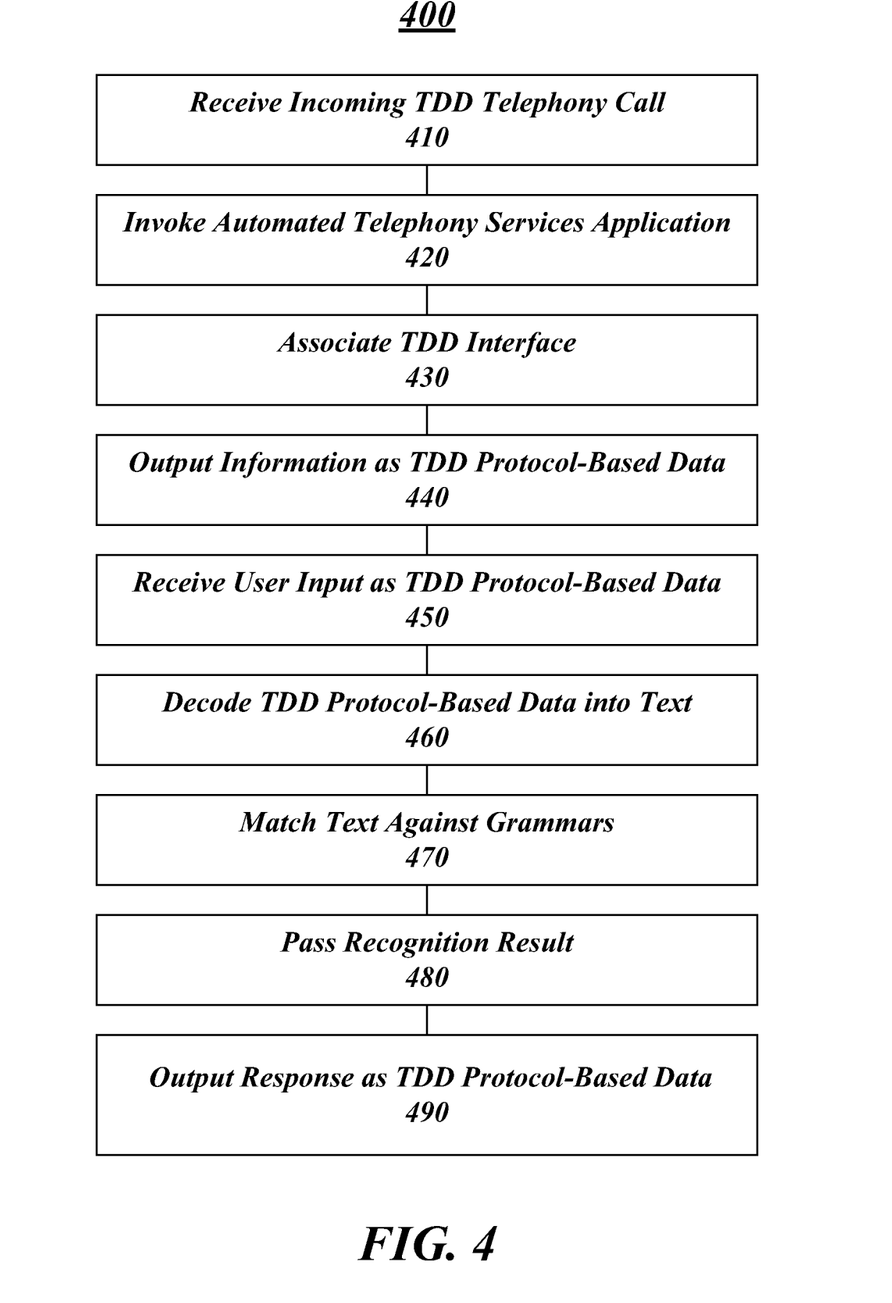
FIG. 4 illustrates an embodiment of a logic flow.

FIG. 4 illustrates a logic flow 400 suitable for practicing various embodiments. The logic flow 400 may be representative of operations executed in accordance with the described embodiments. As shown, the logic flow 400 may comprise receiving an incoming telephony call from a telecommunications device deaf (TDD) protocol-based device placed to a telephone number associated with a server computing system (block 410), invoking an automated telephony services application at the server computing system in response to the incoming telephony call (block 420), associating a TTD interface with the incoming telephony call (block 430), and outputting information from the automated telephony services application to the TDD protocol-based device via the TDD interface as TDD protocol-based data (block 440). In some embodiments, the outputted information may comprise default information or a prompt such as a question or menu.

The logic flow 400 may comprise receiving user input as TDD protocol-based data at the TDD interface (block 450), decoding the TDD protocol-based data into text (block 460), matching the text against one or more grammars associated with automated telephony services to determine a recognition result (block 470), passing the recognition result to the automated telephony services application (block 480), and outputting a response to the TDD protocol-based device via the TDD interface as TDD protocol-based data (block 490).

In various implementations, the automated telephony services application may comprise an IVR application configured to handle voice telephony calls to the telephone number. In such implementations, the IVR application may be automatically enabled to handle TDD telephony calls to the telephone number. In some embodiments, the server computing system may implement an IVR system comprising an automatic speech recognition (ASR) engine, a dual-tone multi-frequency (DTMF) engine, and a text-to-speech (TTS) synthesis engine. In such embodiments, the IVR system may using a text emulation mode to redirect information that would be handled by the ASR engine, DTMF engine, and TTS synthesis engine during a voice telephony call to the TDD interface.

It can be appreciated that while the logic flow 400 may illustrate a certain sequence of steps, other sequences of steps may also be performed according to alternative embodiments. Moreover, some individual steps of the logic flow 400 may include multiple sub-steps that may be performed in various sequences as appropriate to the individual step. Furthermore, additional steps may be added or some steps may be removed depending on the particular implementation.

Figure 5:
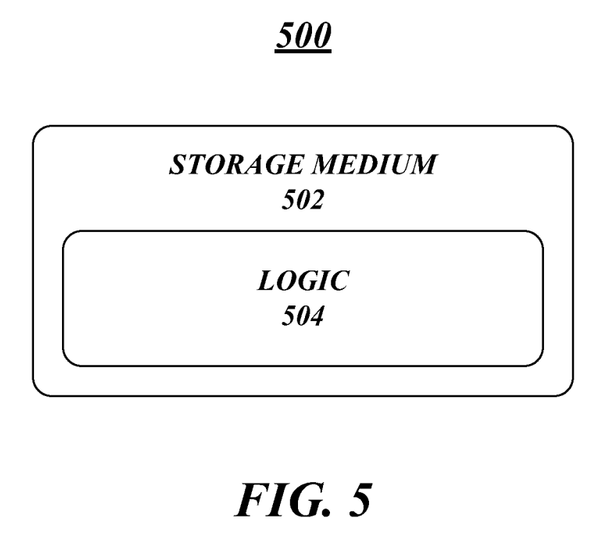
FIG. 5 illustrates an embodiment of an article.

FIG. 5 illustrates a diagram of an article of manufacture 500 suitable for storing logic for the various embodiments. As shown, the article of manufacture 500 may comprise a storage medium 502 to store logic 504. Examples of the storage medium 502 may include one or more types of computer-readable storage media capable of storing electronic data, including volatile memory or non-volatile memory, removable or non-removable memory, erasable or non-erasable memory, writeable or re-writeable memory, and so forth. Examples of the logic 504 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 500 and/or the computer-readable storage medium 502 may store logic 504 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, C#, Java, BASIC, Perl, Matlab, Pascal, Visual BASIC, VoiceXML, assembly language, and others. In some implementations, the logic 504 may comprise executable computer program instructions written in server-side computing language. Alternatively or additionally, the logic 504 may comprise executable computer program instructions written in procedural computing language. The logic 504 may comprise executable computer program instructions written in VoiceXML, which allows additional script such as in ECMAScript.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   receiving an incoming telephony call from a telecommunications device deaf (TDD) protocol-based device placed to a voice telephone number associated with a server computing system;
   analyzing at least one of data signals and data packets of the incoming call and detecting that the incoming call comes from a TDD protocol-based device;
   invoking an automated telephony services application in response to the incoming telephony call;
   associating a TDD interface with the incoming telephony call at the server computing system, wherein the TDD interface receives TDD terms from the TDD protocol-based device, translates at least one TDD term not in conformance to grammars associated with the automated telephony services application, and forms a TDD recognition result that is understood by the automated telephony services application; and
   outputting information from the automated telephony services application to the TDD protocol-based device via the TDD interface as TDD protocol-based data.

2. The computer-implemented method of claim 1, wherein the information comprises default information.

3. The computer-implemented method of claim 1, wherein the information comprises a prompt.

4. The computer-implemented method of claim 3, wherein the prompt comprises one or more of a question, a request, and a menu.

5. The computer-implemented method of claim 1, further comprising:
   receiving user input as TDD protocol-based data at the TDD interface; and
   outputting a response to the TDD protocol-based device via the TDD interface as TDD protocol-based data.

6. The computer-implemented method of claim 5, further comprising:
   decoding the TDD protocol-based data into text;
   matching the text against one or more grammars associated with the automated telephony services application to determine a recognition result; and
   passing the recognition result to the automated telephony services application.

7. The method of claim 1, wherein the automated telephony services application comprises an interactive voice response application configured to handle voice telephony calls to the telephone number.

8. The method of claim 7, further comprising automatically enabling the interactive voice response application to handle TDD telephony calls to the telephone number.

9. The method of claim 1, wherein the server computing system implements an interactive voice response system comprising an automatic speech recognition (ASR) engine, a dual-tone multi-frequency (DTMF) engine, and a text-to-speech (TTS) synthesis engine.

10. The method of claim 9, further comprising using a text emulation mode of the interactive voice response system to redirect information that would be handled by the ASR engine, DTMF engine, and TTS synthesis engine during a voice telephony call to the TDD interface.

11. A computer-readable hardware medium, storing computer-executable program instructions that when executed cause a computing system to:
   receive an incoming telephony call from a telecommunications device deaf (TDD) protocol-based device placed to a voice telephone number associated with a server computing system;
   analyze at least one of data signals and data packets of the incoming call and detect that the incoming call comes from a TDD protocol-based device
   associate a TDD interface with the incoming telephony call, wherein the TDD interface receives TDD terms from the TDD protocol-based device and forms a recognition result that is understood by the automated telephony services application, and translates abbreviated TDD terms to conform to rules of grammars associated with interacting with the automated telephony services application; and output information from an automated telephony services application associated with the telephone number to the TDD protocol-based device via the TDD interface as TDD protocol-based data.

12. The computer-readable hardware medium of claim 11, further comprising stored computer-executable program instructions that when executed cause the computing system to:

receive user input as TDD protocol-based data at the TDD interface; and output a response to the TDD protocol-based device via the TDD interface as TDD protocol-based data.

13. The computer-readable hardware medium of claim 11, further comprising stored computer-executable program instructions that when executed cause the computing system to:

decode the TDD protocol-based data into text;

match the text against one or more grammars associated with automated telephony services application to determine a recognition result; and pass the recognition result to the automated telephony services application.

14. The computer-readable hardware medium of claim 11, further comprising stored computer-executable program instructions that when executed cause the computing system to perform automatic speech recognition, dual-tone multi-frequency recognition, and text-to-speech synthesis.

15. The computer-readable hardware medium of claim 14, further comprising stored computer-executable program instructions that when executed the computing system to redirect information that would be handled during automatic speech recognition, dual-tone multi-frequency recognition, and text-to-speech synthesis to and from the TDD interface.

16. A server computing system, comprising:

a network interface to receive an incoming telephony call from a telecommunications device deaf (TDD) protocol-based device placed to a voice telephone number associated with the server computing system and to analyze at least one of data signals and data packets of the incoming call to detect that the incoming call comes from a TDD protocol-based device;

a web server to invoke an automated telephony services application in response to the incoming telephony call; and a TDD interface to receive TDD terms from the TDD device, form a TDD recognition result that is understood by the automated telephony services application, translates the TDD terms to conform to rules of grammars associated with recognizing data in response to prompts associated with the automated telephony services application, and output information from the automated telephony services application to the TDD protocol-based device via the network interface as TDD protocol-based data.

17. The server computing system of claim 16, the TDD interface to receive user input as TDD protocol-based data and output a response to the TDD protocol-based device as TDD protocol-based data.

18. The server computing system of claim 16, the TDD interface to decode the TDD protocol-based data into text, match the text against one or more grammars associated with automated telephony services to determine a recognition result, and pass the recognition result to the automated telephony services application.

19. The server computing system of claim 18, the TDD interface to translate abbreviated TDD terms to conform to rules of the grammars.

20. The server computing system of claim 16, further comprising a speech server including an automatic speech recognition engine, a dual-tone multi-frequency recognition engine, and text-to-speech synthesis engine.

* * * * *